United States Patent [19]
Peter et al.

[11] 3,840,101
[45] Oct. 8, 1974

[54] TEMPERATURE AND SPEED RESPONSIVE FLUID COUPLING

[75] Inventors: Wolfgang Peter; Herbert Erath, both of Stuttgart; Heinz Koch, Fellbach, all of Germany

[73] Assignee: Daimler-Benz Aktiengesellschaft, Stuttgart, Germany

[22] Filed: Mar. 14, 1973

[21] Appl. No.: 341,169

[30] Foreign Application Priority Data
Mar. 15, 1972 Germany.......................... 2212367

[52] U.S. Cl............ 192/58 B, 192/82 T, 192/104 F
[51] Int. Cl. ... F16d 35/00, F16d 43/25, F16d 43/04
[58] Field of Search............. 192/58 B, 82 T, 103 F, 192/103 FA, 104 F, 105 F

[56] References Cited
UNITED STATES PATENTS

| | | |
|---|---|---|
| 3,059,745 | 10/1962 | Tauschek .................. 192/104 F X |
| 3,144,922 | 8/1964 | Weir.............................. 192/82 T |
| 3,159,254 | 12/1964 | Weir.............................. 192/58 B |
| 3,191,733 | 6/1965 | Weir.............................. 192/58 B |
| 3,559,785 | 2/1971 | Weir.............................. 192/58 B |
| 3,690,428 | 9/1972 | LaFlame.................. 192/103 FA X |

*Primary Examiner*—Allan D. Herrmann
*Attorney, Agent, or Firm*—Craig & Antonelli

[57] ABSTRACT

A fluid friction coupling, especially for the fan drive of internal combustion engines in which at least one working space provided with a working gap is arranged between the driving and driven part and in which additionally a reservoir space is provided which is in communication with the working space by way of an aperture or apertures, whereby the cross section of this aperture or apertures is controllable both by temperature as well as rotational speed; mutually independent control means are provided to control the aperture or apertures as a function of temperature and independently thereof as a function of rotational speed.

30 Claims, 4 Drawing Figures

PATENTED OCT 8 1974　　3,840,101

TEMPERATURE AND SPEED RESPONSIVE FLUID COUPLING

The present invention relates to a fluid friction coupling (viscosity coupling), especially for the fan drive in internal combustion engines, in which at least one working space provided with a working gap is arranged between the driving and the driven part and additionally a reservoir space is provided which is in communication with the working space by way of openings, whereby the cross section of these openings is controllable both by the temperature as also by the rotational speed.

The fans necessary for the operation of motor vehicle internal combustion engines are driven generally at small fan outputs by the engine proportionally to the engine rotational speed if an external drive, for example, by way of an electric motor is not provided. With higher fan outputs, especially at high engine rotational speeds, shiftable clutches or couplings are used very frequently. This is so, because, on the one hand, the cooling without fan is not possible during idling or at small vehicle velocities accompanied with high engine loads which requires correspondingly dimensioned fans while, on the other, at high engine rotational speeds and driving velocities these fans cause an excessive input power and noise development. Furthermore, as fan couplings are known, among others, those which for the transmission of the torque utilize the viscosity forces of a suitable fluid, the so-called viscosity couplings.

Different types of construction with variable and constant filling of the working gap are known in the art with the viscosity couplings whereby the variable filling is achieved in that the access to the working gap is either released or closed off to the operating fluid by a valve. With the known constructions, this valve is actuated by way of a bimetallic switch in dependence on the air temperature to the rear of the engine radiator and therewith in addition to other ambient influences, indirectly on the water temperature of the radiator or is actuated by a centrifugal switch. With a closed valve, a suitable device, such as, as a feed screw or stripper, assure the discharge of the working gap.

Whereas the couplings controlled by the bimetallic switch thus engage only above a predetermined temperature threshold and enable the high fan rotational speed, the systems which are controlled by centrifugal forces remain always engaged below a predetermined shifting rotational speed independently of the engine temperature. In couplings having a constant filling, the highest fan rotational speed is determined by the maximum transmission capacity. A considerable influence of this torque dependence is, however, present also with the shifting systems because it improves the function of the couplings and otherwise larger dimensions would become necessary.

In many cases, couplings controlled by centrifugal forces which are engaged only in the lower engine rotational speed range are adequate for the requirements of normal operation or those with constant filling of the working gap, i.e., torque-limiting couplings. During the cold start from low temperatures, these couplings, however, entail the great disadvantage that the transmission capacity—with centrifugal-force-shifting, above all that below the disengaging rotational speed—is considerably increased by reason of the strongly increased viscosity of the transmission medium, for the most part, silicon oil.

With the purely torque-limiting coupling, very high excessive rotational speeds of the fan with corresponding power input and noise development may therefore occur; however, also with the systems controlled by centrifugal forces, this undesirable effect occurs, and more particularly because, as already mentioned, in normal operation with corresponding oil temperatures, a considerable slippage already occurs prior to the disengaging rotational speed which is strongly reduced at low temperatures and leads to excess rotational speeds. This cannot be avoided also, for example, in that one makes the coupling of larger dimensions and disengages or disconnects earlier corresponding to the lacking coupling slippage because one needs the fan up to higher engine rotational speeds but not with a fan rotational speed increasing proportionally to the engine rotational speed, on the other hand, also not by reason of the increased fan noise. This noise development is the more annoying as the oil warm-up takes place only slowly as a result of the strongly reduced coupling slippage and the unfavorable condition still continues for a long period of time after the cold start.

Couplings of the aforementioned type are also known in the prior art. A valve body or stripper or the like is secured at a bimetallic strip which carries simultaneously a centrifugal weight (German Auslegeschrift 1, 218, 227). While a better cold-starting behavior is made possible thereby, on the other hand, the valve opening is now controlled simultaneously as a function of two magnitudes, i.e., at different temperatures a different rotational speed is associated in each case to the shifting. The influence of the temperature is thereby opposite to that of the rotational speed, i.e., the higher the temperature becomes the higher is also the rotational speed required for the disengagement. A stable regulation and control cannot be achieved with such a coupling.

The present invention is now concerned with the task to avoid these disadvantages. A coupling with good cold starting behavior and stable control characteristics is to be created which also is satisfactory as regards noise development.

The underlying problems are solved according to the present invention with the couplings of the aforementioned type in that this aperture or apertures are controllable by mutually independent means as a function of the temperature and independently thereof as a function of the rotational speed. It is proposed thereby in detail that at least one opening or aperture is arranged in a rotating wall separating the reservoir space from the working space, which aperture is closed off on one side by the rotational speed-dependent control means and, on the other side, by the temperature dependent control means and which is to be opened more or less by these control means below a predetermined upper rotational speed and above a predetermined temperature.

The coupling constructed according to the present invention produces a favorable cold-starting behavior and a stable control over the entire operating range because the shifting points for each control means can be predetermined separately quite accurately. Additionally, a simplification results insofar as the adjustment of the control means can be carried out quite considerably more easily and as a matter of fact, no special narrow tolerances have to be observed during the manufacture thereof.

In one embodiment according to the present invention, the driving coupling part is constructed as an annular body T-shaped in cross section whose outer circumferential surface forms together with the inner circumferential surface of the housing shaped driven coupling part a working gap and whose web forms the partition wall between the reservoir space and the working space. It is then particularly appropriate in this case if a feed screw or thread configuration is arranged in at least one of the surfaces forming the working gap.

It is further proposed according to the present invention in that connection that the web of the annular body which is T-shaped in cross section is offset from its symmetry plane in the direction toward the inlet of the feed screw and thus a larger reservoir space is formed at the outlet or discharge. Another feature of the present invention thereby resides in that at least one transverse opening or aperture is arranged in the web to which is coordinated on the side of the reservoir space a rotational speed-dependent closure member and, on the opposite side, a temperature-dependent closure member.

The control of the aperture by the rotational-speed-dependent and the temperature-dependent means can take place indirectly, however, the present invention prefers as direct a control as possible. Thus, it is proposed, for example, that a bimetallic strip is provided as temperature-dependent closure member which covers the aperture and upon exceeding a predetermined temperature increasingly lifts off from the same. An adjusting screw may thereby be provided in the bimetallic strip in order to adjust the prestress in the closing position or to keep open a very small opening also in the closing position.

It is additionally proposed according to the present invention that the rotational speed-dependent closure member is formed by a pivot lever supported at the web and adapted to be acted upon by centrifugal forces which is pulled by a spring against an abutment or stop into a first position releasing the aperture and which is adapted to be moved by the centrifugal force above a predetermined rotational speed into a second position covering the aperture. A separate abutment or stop may thereby also be provided for this second position. However, it is also possible to utilize the inner circumference of the annular body itself as abutment. A particular advantage may reside in the fact if, according to the present invention, the pivot lever is constructed knee-shaped and is supported at the web with its radially inwardly directed end because, in that case, high accelerations effect a quick closing of the aperture for a short period of time and a running up of the rotational speed of the fan is avoided during the acceleration phase.

It is finally additionally proposed according to the present invention that the bearing support and fastening places of the closure bodies are offset with respect to the aperture in the direction of rotation of the driving coupling part. It can be avoided in this manner that the closure bodies are possibly lifted off with respect to the driving coupling part by the relative movement of the viscous fluid.

Accordingly, it is an object of the present invention to provide a fluid friction coupling for the fan drive of internal combustion engines which avoids by simple means the aforementioned shortcomings and drawbacks encountered in the prior art.

Another object of the present invention resides in a fluid friction coupling for the fan drive of internal combustion engines of motor vehicles which permits a precise, satisfactory control and avoids the development of noises as well as the need for an increase in its dimensions.

A further object of the present invention resides in a fluid friction coupling, especially for the fan drive in internal combustion engines, which provides a proper control of the valve opening as a function of two control magnitudes without reciprocal influence by these control magnitudes.

Still a further object of the present invention resides in a fluid friction coupling of the type described above which assures the attainment of a stable control together with good cold starting behavior and minimization of noise development.

Another object of the present invention resides in a viscosity coupling of the type described above which facilitates the adjustment thereof while eliminating the need for narrow tolerances.

These and further objects, features and advantages of the present invention will become more apparent from the following description when taken in connection with the accompanying drawing which shows, for purposes of illustration only, two embodiments in accordance with the present invention, and wherein.

Figure 1:
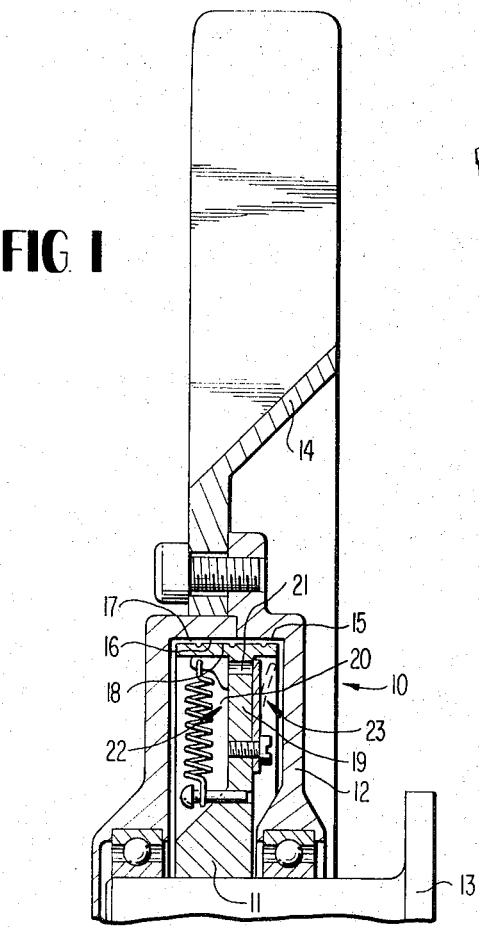
FIG. 1 is a somewhat schematic cross-sectional view of a fan drive in accordance with the present invention.

Referring now to the drawing wherein like reference numerals are used throughout the various views to designate like parts, and more particularly to FIG. 1, the fan coupling generally designated by reference numeral 10 is formed by a driving member 11 and a driven member 12. The driving part 11 is arranged directly on the crankshaft 13 or is operatively connected therewith for rotation in unison therewith. The driven part 12 carries the fan rotor 14 or is drivingly connected therewith.

The driven part 12 is constructed housing like and includes a circumferential surface 15. The annular body, constructed with a T-shaped cross section, of the driving coupling part 11 is arranged on the inside of this housing. Its outer circumferential surface 16 forms, together with the inner circumferential surface 15 of the driven coupling part 12, the working gap 17. A feed screw 18 is provided in the cirumferential surface 16 which assures that the viscous coupling fluid is always moved in the working gap 17 from the right toward the left as viewed in the drawing. The web 19 of the annular body forming the driving coupling part 11 is offset out of the plane of symmetry toward the inlet of the working gap 17. In this manner, a reservoir space 20 is formed on its left side. The web 19 therefore forms a partition wall between the reservoir space 20 and the working gap 17 representing the working space—since the feed always takes place in the working gap 17 from the right toward the left as viewed in the drawing.

Figure 2:
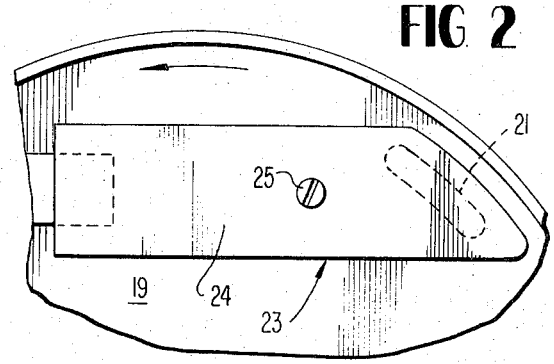
FIG. 2 is a partial elevational view, on an enlarged scale, of the bimetallic control member according to the present invention.

An opening or aperture 21 is provided in the web 19 whose inlet is controlled by a rotational speed-dependent control device generally designated by reference numeral 22 and whose discharge or outlet is controlled by a temperature-dependent control device generally designated by reference numeral 23. According to FIG. 2, a bimetallic strip 24 serves as temperature-dependent control device which is secured at one end at the web 19 and covers with its other end the aperture 21. A washer disk between the strip 24 and the web 19 serves for the adjustment of the bimetallic strip 24. With a corresponding warm-up of ths bimetallic strip 24, it bends more or less off outwardly away from the web 19 (see FIG. 1) so that the aperture 21 is then more or less released. A screw 25 limits with its head the opening stroke or travel of the bimetallic strip 24.

Figure 3:
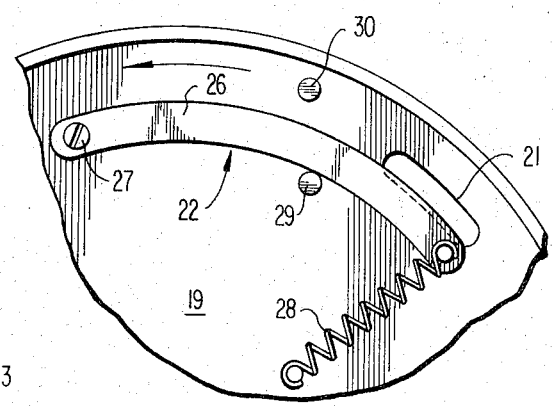
FIG. 3 is a partial elevational view, similar to FIG. 2, illustrating the rotational speed-dependent control member according to the present invention.

According to FIG. 3, a pivot lever 26 serves as rotational speed-dependent control device which is supported at one end at the web 19 by means of a bolt 27. The pivot lever 26 is pulled inwardly by a spring 28 engaging at the other end against an abutment 29. In this position, it releases the aperture 21, i.e., opens the same up. With increasing rotational speed, the centrifugal force engaging at the pivot lever 26 overcomes the force of the spring 28 so that the aperture 21 is more or less closed. In the end position, the pivot lever 26 then abuts at the outer abutment 30, i.e., the closure position is then reached.

Figure 4:
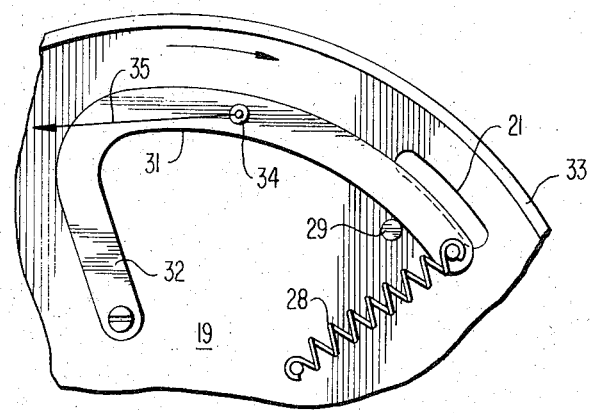
FIG. 4 is a partial elevational view of a modified embodiment of a rotational speed-dependent control member according to the present invention.

According to FIG. 4, the pivot lever 31 is constructed knee-shaped and its end 32 points approximately radially inwardly. As to the rest, the arrangement corresponds to that according to FIG. 3, but the outer abutment 30 has now been eliminated. The rim 33 of the driving coupling part 11 now serves itself as abutment in the closing position. This construction has the effect that during accelerations a tangential component 35 engages at the center of gravity 34 of the pivot lever 31 which brings the pivot lever 31 into the closing position for a short period of time.

The operation of the described fan coupling is believed apparent from the drawings and the preceding description. The working gap 17 is supplied with the viscous fluid only when both control means 22 and 23 are at least partially opened. In all other cases, the working gap 17 is emptied by the feed screw 18, i.e., the coupling is then disengaged. As long as the temperature lies below a predetermined value, for example, during the cold start, the cross aperture 21 always remains closed so that the operating temperature is reached as rapidly as possible. Above a predetermined temperature, the cross aperture 21 is then opened up by the bimetallic strip 24 and in this condition, the control of the coupling takes place as a function of the rotational speed by means of the pivot lever 26 or 31.

While we have shown and described two embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

What we claim is:

1. A fluid friction coupling (viscosity coupling) which comprises a driving part and a driven part and in which a working space provided with a working gap is arranged between the driving part and the driven part while additionally a reservoir space is provided which is in communication with the working space by way of aperture means, the cross section of the aperture means being controllable both by the temperature as also the rotational speed, characterized in that mutually separate control means are provided for controlling said aperture means in dependence on the temperature and independently thereof on the rotational speed.

2. A coupling according to claim 1, characterized in that the coupling is part of a fan drive in internal combustion engines.

3. A fluid friction coupling (viscosity coupling) which comprises a driving part and a driven part and in which a working space provided with a working gap is arranged between the driving part and the driven part while additionally a reservoir space is provided which is in communication with the working space by way of aperture means, the cross section of the aperture means being controllable both by the temperature as also the rotational speed, characterized in that mutually separate control means are provided for controlling said aperture means in dependence on the temperature and independently thereof on the rotational speed, and characterized in that a wall means separates the reservoir space from the working space, at least one aperture means being provided in said wall means which is closed on one side by the rotational speed-dependent control means and on the other side by the temperature-dependent control means, said aperture means being more or less opened by said control means below a predetermined upper rotational speed and above a predetermined temperature.

4. A coupling according to claim 3, characterized in that the driving part includes an annular body means T-shaped in cross section with an outer circumferential surface which forms the working gap together with an inner circumferential surface of the driven part which is constructed housing-shaped, the web of said T-shaped annular body means forming the wall means between the reservoir space and the working space.

5. A coupling according to claim 4, characterized in that a feed screw means is arranged in at least one of the surfaces forming the working gap.

6. A coupling according to claim 5, characterized in that the web of the T-shaped annular body means is offset from its plane of symmetry in the direction toward the inlet of the feed screw means and thus the reservoir space is formed at the discharge of the feed screw means.

7. A coupling according to claim 6, characterized in that said aperture means comprises a cross aperture means which is provided in the web to which is coordinated on the side of the reservoir space a rotational speed-dependent closure means forming part of the corresponding control means and on the opposite side a temperature dependent closure means forming part of the other corresponding control means.

8. A coupling according to claim 7, characterized in that the temperature-dependent closure means includes a bimetallic strip which covers the aperture means and which, upon exceeding a predetermined temperature, increasingly lifts off therefrom.

9. A coupling according to claim 8, characterized in that the rotational speed-dependent closure means includes a pivot lever supported at the web and acted upon by centrifugal forces which is pulled by a spring against an abutment into a first position opening up the aperture means and which is adapted to be moved by centrifugal forces above a predetermined rotational speed into a second position covering said aperture means.

10. A coupling according to claim 9, characterized in that the pivot lever is constructed knee-shaped and is supported at the web with its approximately radially inwardly facing end.

11. A coupling according to claim 10, characterized in that the support and fastening places of the closure means are offset with respect to the aperture means in the direction of rotation of the driving coupling part.

12. A coupling according to claim 11, characterized in that the coupling is part of a fan drive in internal combustion engines.

13. A fluid friction coupling (viscosity coupling) which comprises a driving part and a driven part and in which a working space provided with a working gap is arranged between the driving part and the driven part while additionally a reservoir space is provided which is in communication with the working space by way of aperture means, the cross section of the aperture means being controllable both by the temperature as also the rotational speed, characterized in that mutually separate control means are provided for controlling said aperture means in dependence on the temperature and independently thereof on the rotational speed, the driving part includes an annular body means T-shaped in cross section whose outer circumferential surface forms the working gap together with an inner circumferential surface of the driven part which is constructed housing-shaped, and the web of said T-shaped annular body means forms a partition wall means between the reservoir space and the working space.

14. A coupling according to claim 13, characterized in that a feed screw means is arranged in at least one of the surfaces forming the working gap.

15. A coupling according to claim 14, characterized in that the web of the T-shaped annular body means is offset from its plane of symmetry in the direction toward the inlet of the feed screw means and the reservoir space is formed at the discharge of the feed screw means.

16. A coupling according to claim 13, characterized in that said aperture means comprises a cross aperture means which is provided in the web to which is provided on the side of the corresponding control means and on the opposite side a temperature-dependent closure means forming part of the other corresponding control means.

17. A coupling according to claim 16, characterized in that the temperature-dependent closure means includes a bimetallic strip which covers the aperture means and which, upon exceeding a predetermined temperature, increasingly lifts off therefrom.

18. A coupling according to claim 16, characterized in that the rotational speed-dependent closure means includes a pivot lever supported at the web and acted upon by centrifugal forces which is pulled by a spring against an abutment into a first position opening up the aperture means and which is adapted to be moved by centrifugal forces above a predetermined rotational speed into a second position covering said aperture means.

19. A coupling according to claim 18, characterized in that the pivot lever is constructed knee-shaped and is supported at the web with its radially inwardly facing end.

20. A coupling according to claim 18, characterized in that the temperature dependent closure means includes a bimetallic strip which covers the aperture means and which, upon exceeding a predetermined temperature, increasingly lifts off therefrom.

21. A coupling according to claim 19, characterized in that the support and fastening places of the closure means are offset with respect to the aperture means in the direction of rotation of the driving coupling part.

22. A fluid friction coupling comprising: driving means,
driven means to be driven by said driving means, said driving means and said driven means being separated by a working gap,
reservoir means in fluid flow communication with said working gap via aperture means for supplying friction fluid to said gap,
temperature-responsive control means for controlling the opening size of said aperture means in response to temperature, and
rotational speed-responsive control means, mutually separate from said temperature-responsive control means, for controlling the opening size of said aperture means independently of said temperature-responsive control means.

23. A fluid friction coupling according to claim 22, wherein the driven means comprises an annular housing of U-shaped cross-section and the driving means is enclosed in said housing with an outer circumferential surface of the driving means facing a circumferential surface of the driven means.

24. A coupling according to claim 22, wherein a wall means separates the reservoir means from the working gap, and wherein said aperture means includes at least one aperture in said wall means which is closed on one side by the rotational speed-responsive control means and on the other side by the temperature-responsive control means, said aperture being at least partially opened by said control means below a predetermined upper rotational speed and above a predetermined temperature.

25. A coupling according to claim 23, wherein the driving means further comprises an annular body means T-shaped in cross section whose outer circumferential surface forms the working gap together with the circumferential surface of the driven means, and the web of said T-shaped annular body means forms a partition wall means between the reservoir means and a working space.

26. A coupling according to claim 25, wherein a feed screw means having an inlet and a discharge is arranged in at least one of the surfaces forming the working gap.

27. A coupling according to claim 26, wherein the web of the T-shaped annular body means is offset from its plane of symmetry in the direction toward the inlet of the feed screw means and the reservoir means is formed at the discharge of the feed screw means.

28. A coupling according to claims 25, wherein said aperture means comprises a cross aperture means which is provided in the web to which is attached on the side of the reservoir means a rotational speed-dependent closure means forming part of the rotational speed-responsive control means and to which is attached on the opposite side a temperature-dependent closure means forming part of the temperature-responsive control means.

29. A coupling according to claim 28, wherein the temperature-dependent closure means includes a bimetallic strip which covers the aperture means and which, upon exceeding a predetermined temperature, increasingly lifts off therefrom.

30. A coupling according to claim 28, wherein the rotational speed-dependent closure means includes a pivot lever supported at the web and acted upon by centrifugal forces which is pulled by a spring against an abutment into a first position opening up the aperture means and which is adapted to be moved by centrifugal forces above a predetermined rotational speed into a second position covering said aperture means.

* * * * *